United States Patent

Barnum et al.

[11] 3,979,717
[45] Sept. 7, 1976

[54] HELICOPTER WARNING SYSTEM

[75] Inventors: Ronald E. Barnum, Trumbull; Franklin A. Tefft, Killingworth; Louis S. Cotton, Monroe, all of Conn.

[73] Assignee: United Technologies Corporation, Hartford, Conn.

[22] Filed: Mar. 18, 1975

[21] Appl. No.: 559,452

Related U.S. Application Data

[63] Continuation-in-part of Ser. No. 476,126, June 3, 1974, abandoned.

[52] U.S. Cl. .......................... 340/27 R; 73/178 H; 235/150.2; 244/17.13; 343/7 TA
[51] Int. Cl.² .......................................... G01C 5/00
[58] Field of Search .......... 73/178 R, 178 T, 178 H; 235/150.2, 150.22; 244/17.13, 77 A, 77 D, 1 R, 17.17, 180, 181, 183; 318/583, 584; 340/27 R, 27 NA, 27 AT; 343/7 TA, 112 CA

[56] References Cited
UNITED STATES PATENTS

| | | | |
|---|---|---|---|
| 2,871,699 | 2/1959 | Kenyon | 73/178 H |
| 3,040,568 | 6/1962 | Markusen et al. | 244/77 A X |
| 3,080,546 | 3/1963 | Deschamps et al. | 340/27 NA |
| 3,295,795 | 1/1967 | Meek, Jr. et al. | 244/17.17 |
| 3,417,729 | 12/1968 | Gilday et al. | 244/1 R X |
| 3,489,378 | 1/1970 | Watson et al. | 244/77 A |
| 3,617,848 | 11/1971 | Friday et al. | 318/584 |
| 3,658,280 | 4/1972 | McDonnell | 244/77 D |
| 3,715,718 | 2/1973 | Astengo | 340/27 R |

*Primary Examiner*—Stephen G. Kunin
*Attorney, Agent, or Firm*—Norman Friedland

[57] ABSTRACT

To prevent inadvertent ground contact of the tail of a helicopter during a landing operation without providing a continuous warning signal for normal landings the altitude and attitude signals are scaled such that when they are equal and opposite in voltage and phase compared to a ground contact curve the comparator will energize a relay for actuating a pilot warning signal. A rate of descent signal biases the altitude signal upward varying in proportion to rate of descent as to enable the pilot to have sufficient warning time to take corrective action.

6 Claims, 3 Drawing Figures

HELICOPTER WARNING SYSTEM

CROSS-REFERENCE

This is a continuation-in-part of application Ser. No. 476,126 filed on June 3, 1974 and assigned to the same assignee, now abandoned.

BACKGROUND OF THE INVENTION

This invention relates to helicopters and particularly to a warning system that provides sufficient time for the pilot to avoid a tail contact during a landing operation.

Heretofore, the helicopter provided means for warning the pilot of a potential tail contact whenever the wheels are in the down or landing position, the aircraft is below 150 ft. and the nose of the helicopter is above 10° referenced with the horizon. When all of these criteria were met, a sound signal was imposed in the intercom system. Obviously, these criteria were not necessarily indicative of the tail striking and as a matter of fact the criteria could exist for a normal landing approach. Hence, the signal nonetheless was actuated and has been a cause of annoyance to the pilot.

Our invention contemplates providing a warning signal solely when a tail contact is imminent and a normal landing cannot ensue without corrective action. Hence, our invention is designed to scale the altitude and attitude signals such that when they are equal and opposite in voltage and phase the comparator will trip turning on a relay driver which will cause the warning note to be applied to the intercom system. A rate of descent signal is also summed serving to bias the line upward varying in proportion to the rate of descent. Thus, sufficient warning prior to tail contact will allow pilot sufficient time to remedy the situation.

SUMMARY OF THE INVENTION

An object of this invention is to provide means to improve the warning signal to the pilot of a helicopter whenever ground contact of the tail is imminent.

A further object of this invention is to trigger a warning signal whenever the voltage and phase of the attitude and altitude are equal and opposite in value reference to a precalculated ground contact reference line that is biased as a function of helicopter rate of descent.

Other features and advantages will be apparent from the specification and claims and from the accompanying drawings which illustrate an embodiment of the invention.

DESCRIPTION OF THE PREFERRED EMBODIMENT

Figure 1:
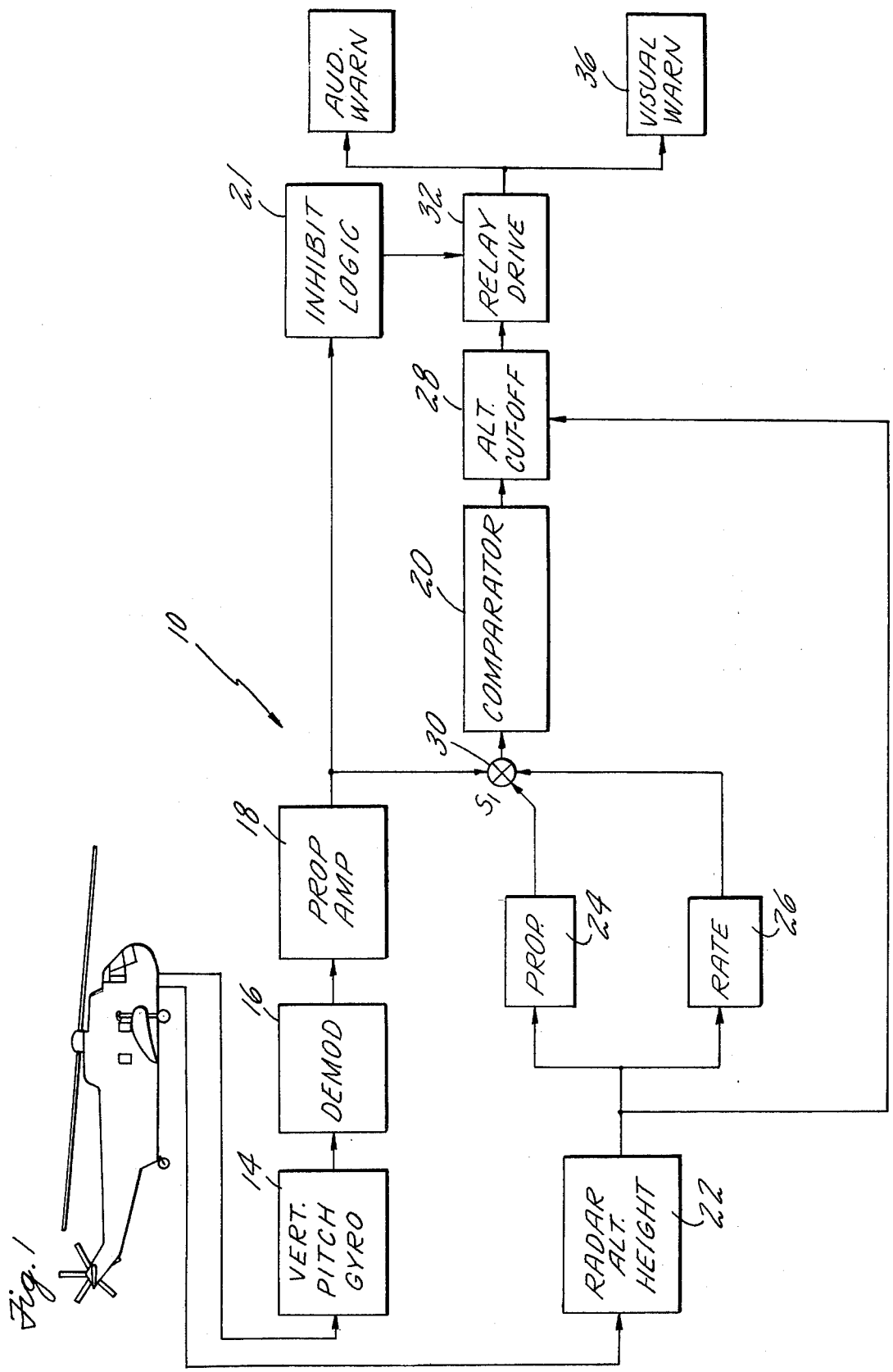
FIG. 1 is a schematic and block diagram representing the preferred embodiment of this invention.
Figure 2:
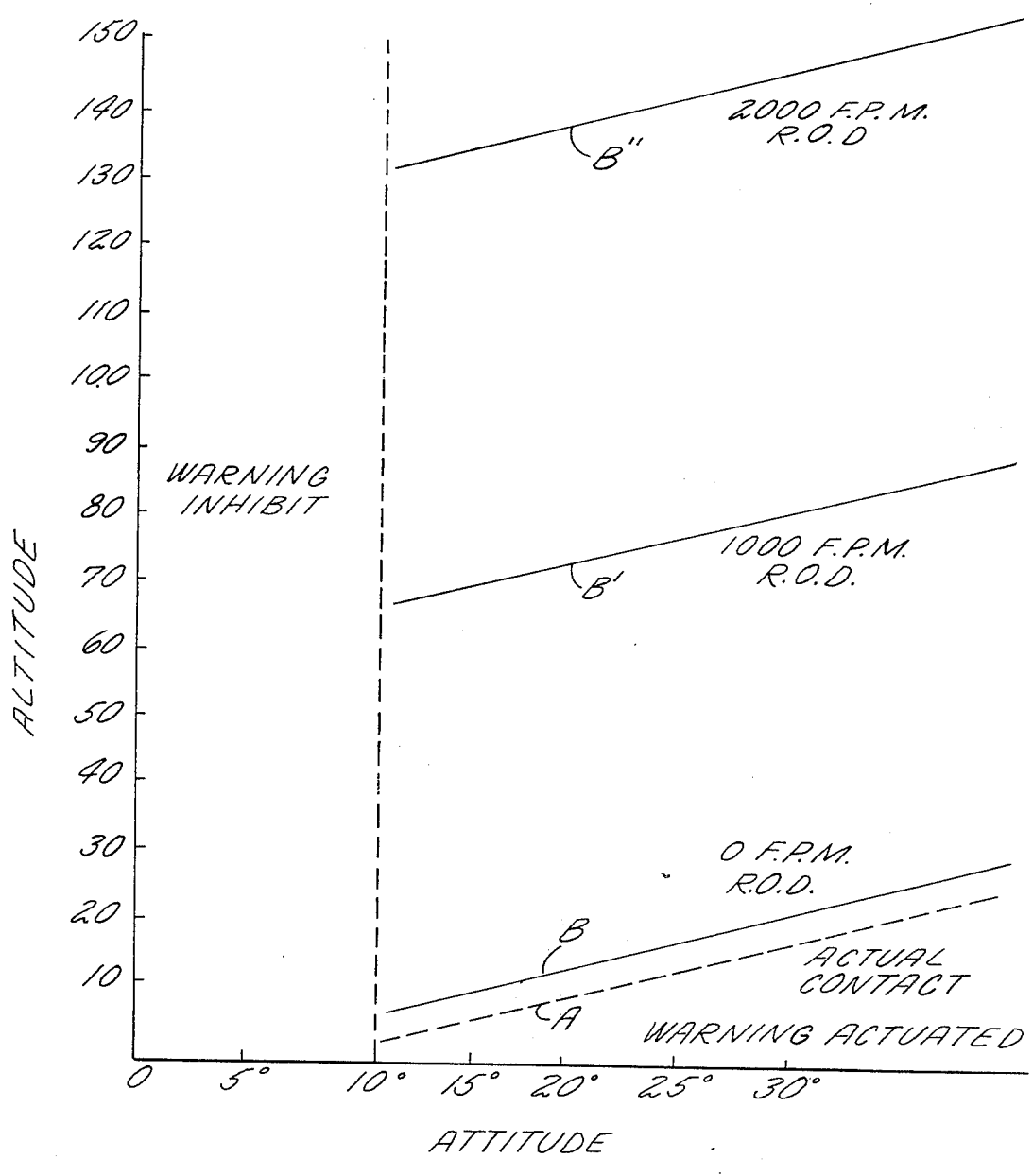
FIG. 2 is a graph plotting the altitude vs attitude and illustrating the aspect of rate of descent.

The invention can best be understood by referring to FIGS. 1 and 2 which illustrate the preferred embodiment although the detailed circuitry is omitted for the sake of simplicity and convenience. It is to be understood that in this embodiment while the well known conventional electronic circuitry is preferred as one skilled in the art will appreciate this invention can be practiced with the utilization of other mediums.

Signals indicative of the helicopter's pitch and altitude by a commercially available vertical gyroscope and a commercially available radar altimeter are processed by the altitude warning network shown in the block diagram generally illustrated by numeral 10.

As can be seen by referring to FIG. 1 the vertical gyro pitch signal illustrated by block 14 is an AC error signal which is processed by demodulator 16 to a DC magnitude signal. All signals indicative of a nose down condition of the helicopter which could otherwise trigger the warning signal is rejected by this circuitry.

The demodulated pitch signal is then amplified by the amplifier 18 which produces a signal proportional to the pitch attitude of the aircraft.

Also noted from a viewing of FIG. 1 the radar altimeter height signal represented by block 22 which is conventionally a DC signal is routed in three directions, (a) to the proportional amplifier 24, the rate of descent amplifier 26 and the altitude cut-off circuit 28. Both the gains of the proportional and rate of descent amplifiers 24 and 26 are precalculated to satisfy comparator actuation at various rates of descents as compared to helicopter attitude.

Additionally, the warning network provides means for assuring that the warning signal is not actuated whenever the pitch of the aircraft is such that the tail would not contact the ground during a normal landing approach. Inhibit logic-circuit represented by block 21 responding to the output of amplifier 18 assures that the warning signal is never actuated when the pitch is below a predetermined angle of say 8.5°.

The output of proportional amplifier 18, proportional amplifier 24, and rate of descent amplifier 26 are summed in summer 30 which produces an output signal solely when the voltage and phase of the altitude and pitch (attitude) signals are equal and opposite. The summer 30 is biased, as noted from FIG. 1, by the output of rate of descent amplifier 26 so that the altitude signal is shifted upwardly as a function of the rate of descent of the helicopter. This signal anticipates contact by measuring rate of descent.

This is more apparent by a view of FIG. 2 which is a graphical representation of altitude vs attitude. As noted, the actual tail contact is represented by the dash line A. The minimum line B (ground level) is indicative of the value when the comparator will trigger a signal to the relay driver 32 (FIG. 1) to actuate either the audio or visual indicators 34 and 36 respectively or both. This line is shifted upwardly as a function of an increase in rate of descent (calculated by the rate amplifier 26) of the helicopter. Hence B' represents when warning occurs at a 1000 FPM rate of descent and B'' when a 2000 FPM rate of descent, etc.

The purpose of the altitude cut-off 28 is to prevent the warning signal from being inadvertently actuated above some predetermined maximum altitude, say 500 ft. Hence the warning signal can occur anytime below 500 ft. and touchdown.

Figure 3:
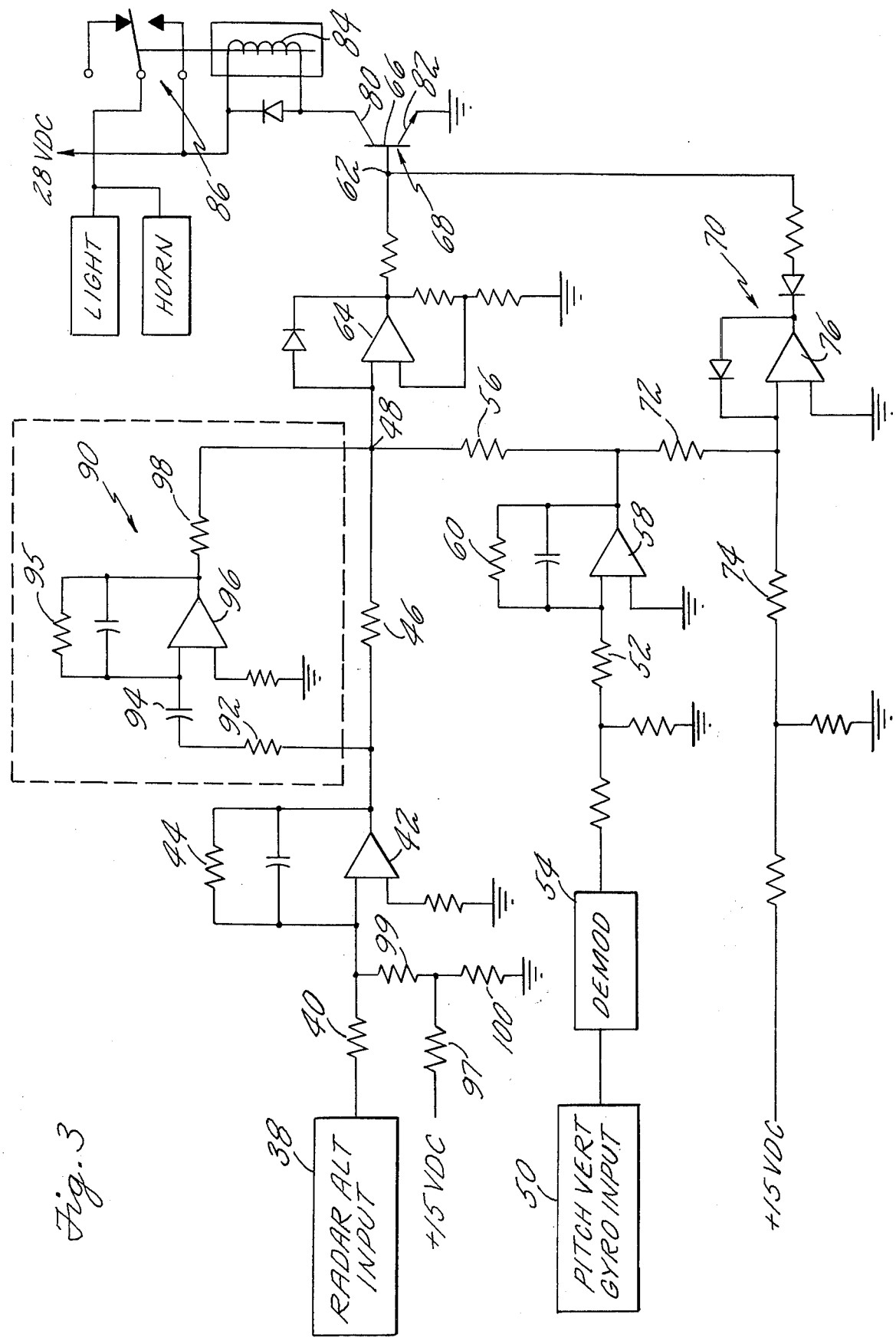
FIG. 3 is a circuit diagram of the preferred embodiment.

Circuitry embodying this invention has been built and flight tested which circuitry is shown in FIG. 3. As noted in FIG. 3 a suitable commercially available radar altimeter 38 produces a voltage drop across input resistor 40 as a function of altitude. This signal is amplified by the operational amplifier 42 and applied to resistor 46. The gain of amplifier 42 is established by the resistance selected for input resistor 40 and feedback resistor 44. The output of resistor 46 which is always positive with respect to the altitude input signal is applied to the summation junction 48.

A suitable commercially available pitch vertical gyro 50, produces an AC signal proportional to the pitch of the aircraft which is applied to input resistor 52 after being demodulated by a suitable commercially available demodulator 54. This signal after being amplified by a suitable operational amplifier 58 is applied to resistor 56 so that its voltage drop is proportional to the pitch of the aircraft. The gain of amplifier 58 is established by input resistor 52 and feedback resistor 60. Hence, the voltage drop across resistor 56 is proportional to the altitude of the aircraft. When its magnitude and polarity is equal and opposite to the polarity of the altitude signal at junction 48 the input to the comparator 63 will be negative with respect to junction point 62 and pass through amplifier 64 to be applied to the base 66 of transistor 68.

The output of inhibit logic circuit 70 is applied to junction point 62 and is always such that its polarity is negative when the attitude is say below 8.5° nose up condition. Hence the output of amplifier 58 is also applied across resistor 72 and when it is equal and opposite to the output of resistor 74 the polarity of the output of amplifier 76 of the inhibit logic circuit 70 will neutralize the negative signal at junction 62. This permits the output of amplifier 64 of comparator circuit 63 to turn on base 66 of transistor 68 whenever it is positive with respect to the input of amplifier 64.

The rate of change of altitude is sensed by the R - C circuit 90 which comprises the serially connected resistor 92, capacitor 94. This signal is amplified by suitable operational amplifier 96 and applied to resistor 98. The voltage drop across resistor 98 is hence, proportional to the rate of descent of the aircraft and is applied to summation junction 48 to bias the altitude and attitude signal. As shown in FIG. 2, this serves to shift the curve B upwardly as a function of rate of descent. The gain of operational amplifier 96 is obtained by the values of input resistor 94 and feedback resistor 95.

The light and/or horn are actuated by the relay 86 consisting of coil 84 operating contact arm 86. Hence when the base 66 is positive. This turns on the relay driver 68, actuating coil 84 and connecting the horn and light to the 28 voltage source.

The voltage divider consisting of resistors 97, 99 and 100 connected to the 15 DC voltage source biases the output of resistor 40 to establish the lower limit of curve B of FIG. 2.

What has been shown by this invention is a simple, yet effective means for actuating a warning signal to provide adequate time to permit the pilot to take corrective action so as to avoid the tail propeller from contacting the ground. This concept avoids the constant warning that would occur if the warning device was actuated upon reaching two predetermined variables as was the heretofore situation.

It should be understood that the invention is not limited to the particular embodiments shown and described herein, but that various changes and modifications may be made without departing from the spirit or scope of this novel concept as defined by the following claims.

We claim:

1. For a helicopter of the type that includes a tail stabilizer or tail skid, means for providing a warning signal solely when the tail is in a position that it might contact the ground, and for avoiding the signal when the helicopter lands normally, said means including a first operational amplifier providing a first voltage signal that is proportional to helicopter altitude, a second operational amplifier for providing a second voltage signal that is proportional to a helicopter attitude, a voltage comparator responsive to said first and second voltage signals, audio or visual warning means responsive to said comparator for being actuated whenever the voltage of said first voltage signal is equal to and opposite in polarity from said second voltage signal, and a third operational amplifier responsive to the rate of descent of said helicopter for producing a bias voltage on said first voltage signal.

2. The helicopter warning means of claim 1 including a vertical pitch gyro for producing a voltage signal proportional to the attitude of said helicopter.

3. The helicopter warning means as claimed in claim 2 including a demodulator for converting an alternating current produced by said vertical pitch gyro to a direct current.

4. The helicopter warning means in claim 1 including a radar altimeter for producing a voltage signal proportional to the altitude of said helicopter.

5. The helicopter warning means as claimed in claim 1 including an input resistor and a feedback resistor operatively connected to each of said first and second operational amplifiers for establishing the gain of said first and second operational amplifiers, the values of said input resistors and feedback resistors determining the operational value of turning on said operational amplifiers in relationship to the operating points of actuating the warning system with relation to the altitude and attitude of said helicopter.

6. The helicopter warning means as claimed in claim 1 including an inhibit logic circuitry including an additional amplifier biasing the output of said comparator to inhibit the voltage signal when said attitude is below a predetermined value.

* * * * *